United States Patent [19]

Miura et al.

[11] Patent Number: 5,356,599
[45] Date of Patent: Oct. 18, 1994

[54] CONTINUOUS POWDER CATALYST SUPPLY APPARATUS AND CATALYST SUPPLY SYSTEM

[75] Inventors: Yasuhiro Miura, Chiba; Kozo Miyazaki, Sodegaura; Yoshio Iino, Ichihara; Mitsuru Tamura, Sodegaura; Yukio Fukada, Ichihara; Hiroshi Akimoto, Numazu, all of Japan

[73] Assignees: Sumitomo Chemical Co., Ltd., Osaka; Akatake Engineering Co., Ltd., Shizuoka, both of Japan

[21] Appl. No.: 17,289

[22] Filed: Feb. 12, 1993

[30] Foreign Application Priority Data

Feb. 14, 1992 [JP] Japan .................. 4-028308

[51] Int. Cl.$^5$ .................. B01J 8/08; B67D 5/00
[52] U.S. Cl. .................. 422/219; 222/370; 222/636; 422/310
[58] Field of Search .................. 422/219, 310; 222/636, 222/370

[56] References Cited

U.S. PATENT DOCUMENTS

| | | | |
|---|---|---|---|
| 2,574,231 | 11/1951 | Sinden | 222/370 |
| 3,779,712 | 12/1973 | Calvert et al. | 222/370 X |
| 4,367,988 | 1/1983 | Leong | 222/370 X |
| 4,528,848 | 7/1985 | Häfner | 222/370 X |
| 4,681,484 | 7/1987 | Egger | 222/370 X |
| 4,747,524 | 5/1988 | Krambrock | 222/636 |
| 4,774,299 | 9/1988 | Dumain et al. | 526/64 |
| 5,209,607 | 5/1993 | Wei et al. | 222/636 X |

FOREIGN PATENT DOCUMENTS

| | | |
|---|---|---|
| 1370492 | 10/1974 | United Kingdom . |
| 1412619 | 11/1975 | United Kingdom . |

*Primary Examiner*—Robert J. Warden
*Assistant Examiner*—Robert Carpenter
*Attorney, Agent, or Firm*—Birch, Stewart, Kolasch & Birch

[57] ABSTRACT

A continuous powder catalyst supply apparatus and a catalyst supply system that is suitable for olefin gas phase polymerization. The supply apparatus comprises a catalyst storage chamber having a catalyst inlet port and a catalyst supply port for transmitting the catalyst to the reactor. Inside the catalyst storage chamber is a catalyst supply mechanism which substantially continuously supplies the catalyst to the catalyst supply port, and a forcible discharge mechanism which forcibly discharges the catalyst, supplied from the catalyst supply mechanism, through the catalyst supply port with a pressurized gas. The apparatus can be used to supply the catalyst to the reactor with low amounts of pressurized gas. Further, the system can be configured so as to avoid contamination of stored catalyst by reactant gas.

19 Claims, 4 Drawing Sheets

CONTINUOUS POWDER CATALYST SUPPLY APPARATUS AND CATALYST SUPPLY SYSTEM

BACKGROUND OF THE INVENTION

1. Field of the Invention

The present invention relates to a powder catalyst supply apparatus and a catalyst supply system and, more particularly, to a powder catalyst supply apparatus and a catalyst supply system which are suitable for olefin gas phase polymerization reaction.

2. Related Background Art

In an apparatus for manufacturing a polyolefin by using an olefin gas phase polymerization reaction vessel, a powder catalyst must be supplied to the reaction vessel. It is preferable that this powder catalyst be continuously supplied. In reality, however, there is no apparatus that can continuously and constantly supply granulated powder particles into a gas phase polymerization reaction vessel at a high pressure. As disclosed in Japanese Patent Publication No. 49-17426 and Japanese Patent Laid-Open No. 60-227824, a batch metering/supplying system is generally employed, in which a catalyst is metered by a metering pipe, and is supplied by using an inert gas as a carrier gas. An example of the batch metering/supplying system will be described below with reference to FIG. 1.

A powder catalyst is supplied from a catalyst storage hopper 2 to a gas phase polymerization reaction vessel 1 by using an olefin gas or an inert gas as a carrier gas, and a polymerization reaction is caused, thereby manufacturing a polyolefin. In this catalyst supply method, in order to prevent solidification of powder particles, which is caused when an olefin gas enters the catalyst storage hopper 2, a batch supply system using a metering pipe 3 is employed. More specifically, a valve 8 is opened while the valves 4, 5, and 6 are closed, so as to fill a volume tank 7 with an inert gas which does not contribute to a reaction. Thereafter, the valve 8 is closed, and the valve 4 is opened to inject a catalyst from the catalyst storage hopper 2 into the metering pipe 3. The valve 4 is then closed, and the valves 5 and 6 are opened to supply the catalyst in the metering pipe 3 into a catalyst supply pipe 9, by using a pressurized gas from the volume tank 7. The catalyst supplied to the catalyst supply pipe 9 is supplied to the gas phase polymerization reaction vessel 1 together with the olefin gas flowing in the catalyst supply pipe 9. By repeating this operation, entrance of the olefin gas into the catalyst storage hopper 2 can be prevented, and the catalyst can be supplied to the gas phase polymerization reaction vessel 1 at a high pressure. In the gas phase polymerization reaction vessel 1, the supplied catalyst speeds up a polymerization reaction, thus manufacturing a polyolefin.

In addition, Japanese Patent Publication No. 53-8666 discloses an apparatus which is constituted by a metering means having a rotating shaft member and is designed to inject granular particles into a reaction chamber. In this apparatus, granular particles are supplied from the metering means to the reaction chamber through a capillary tube having an inner diameter of 0.76 to 3.2 mm. For this reason, when granular particles are to be supplied in a large amount, the capillary tube may clog up, and hence it is difficult to stably supply granular particles to a reaction vessel of an industrial scale.

In the conventional system, although entrance of an olefin gas into the catalyst storage hopper 2 and solidification of a catalyst upon polymerization can be prevented, the catalyst is intermittently supplied from the catalyst storage hopper 2 to the catalyst supply pipe 9. For this reason, the catalyst is intermittently supplied to the gas phase polymerization reaction vessel 1 to interfere with uniform distribution of the catalyst in the gas phase polymerization reaction vessel 1. As a result, a dense catalytic portion is formed to generate a lump upon local polymerization, and a mixing failure is caused in the reaction vessel 1, increasing the possibility of clogging up the reaction vessel 1. In addition, the manufacture of uniform products is adversely affected. It is considered that the period at which the catalyst is intermittently supplied may be shortened by reducing the capacity of the metering pipe 3. In this case, however, the frequency of opening/closing operations of the valves is increased to shorten the service life of the apparatus.

SUMMARY OF THE INVENTION

It is an object of the present invention to provide a powder catalyst supply apparatus and a catalyst supply system which minimize the amount of an inert gas to be supplied, when a powder catalyst is to be supplied to a gas phase polymerization reaction vessel, and prevent generation of a lump caused by nonuniform distribution of the catalyst in the reaction vessel, thereby manufacturing a polyolefin of uniform quality with continuous supply of the catalyst.

A continuous powder catalyst supply apparatus of the present invention is characterized by comprising catalyst storage means having a catalyst inlet port formed in an upper portion thereof and a catalyst supply port formed in a bottom surface thereof to supply a catalyst by free fall, catalyst supply means, formed in the catalyst storage means, for substantially continuously supplying the catalyst to the catalyst supply port, and forcible discharge means for forcibly discharging the catalyst, supplied from the catalyst supply means to the catalyst supply port, through the catalyst supply port with a pressurized gas.

In addition, a catalyst supply system of the present invention is characterized by comprising the continuous powder catalyst supply apparatus, a gas phase polymerization reaction vessel, and an ejector, having a suction port connected to the catalyst supply port, an olefin gas exhaust port connected to the gas phase polymerization reaction vessel, and an inlet port for receiving an olefin gas, for generating a negative pressure in the suction port by supplying the olefin gas, drawing the catalyst through the catalyst supply port of the continuous powder catalyst supply apparatus, and supplying the catalyst into the gas phase polymerization reaction vessel together with the olefin gas.

According to the continuous powder catalyst supply apparatus of the present invention, with the above-described arrangement, the catalyst supplied from the catalyst supply port formed in the polymerization reaction catalyst storage means by free fall can be reliably discharged, and the catalyst can be substantially continuously supplied to a gas phase polymerization reaction vessel.

In addition, although a large amount of inert gas in the gas phase polymerization reaction vessel is inhibited from being supplied to the catalyst supply port, the inert gas constantly flows within an allowable range of amounts. Therefore, the catalyst metered by the continuous catalyst supply apparatus is forcibly discharged to the catalyst suction port of an ejector by free fall due to its own weight and by the inert gas. The amount of inert gas which does not contribute to a polymerization reaction can be reduced by the forcible discharge means based on this inert gas and by the effect of the ejector.

Furthermore, in the catalyst supply system of the present invention, a suction means constituted by an ejector is arranged at the supply port of a catalyst supply apparatus, and an olefin gas is supplied to a gas phase polymerization vessel through the ejector so as to draw a catalyst with a suction force generated by the ejector, thereby supplying the catalyst to the gas phase polymerization reaction vessel intrained with the olefin gas.

With the functions of the inert gas and the ejector described above, the olefin gas does not flow back to the catalyst supply apparatus unless the piping between the ejector and the gas phase polymerization reaction chamber clogs up. Therefore, a polymerization reaction in the catalyst supply apparatus can be prevented, and clogging due to the formation of a polymer can be prevented, thereby allowing stable supply of the catalyst.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Figure 1:
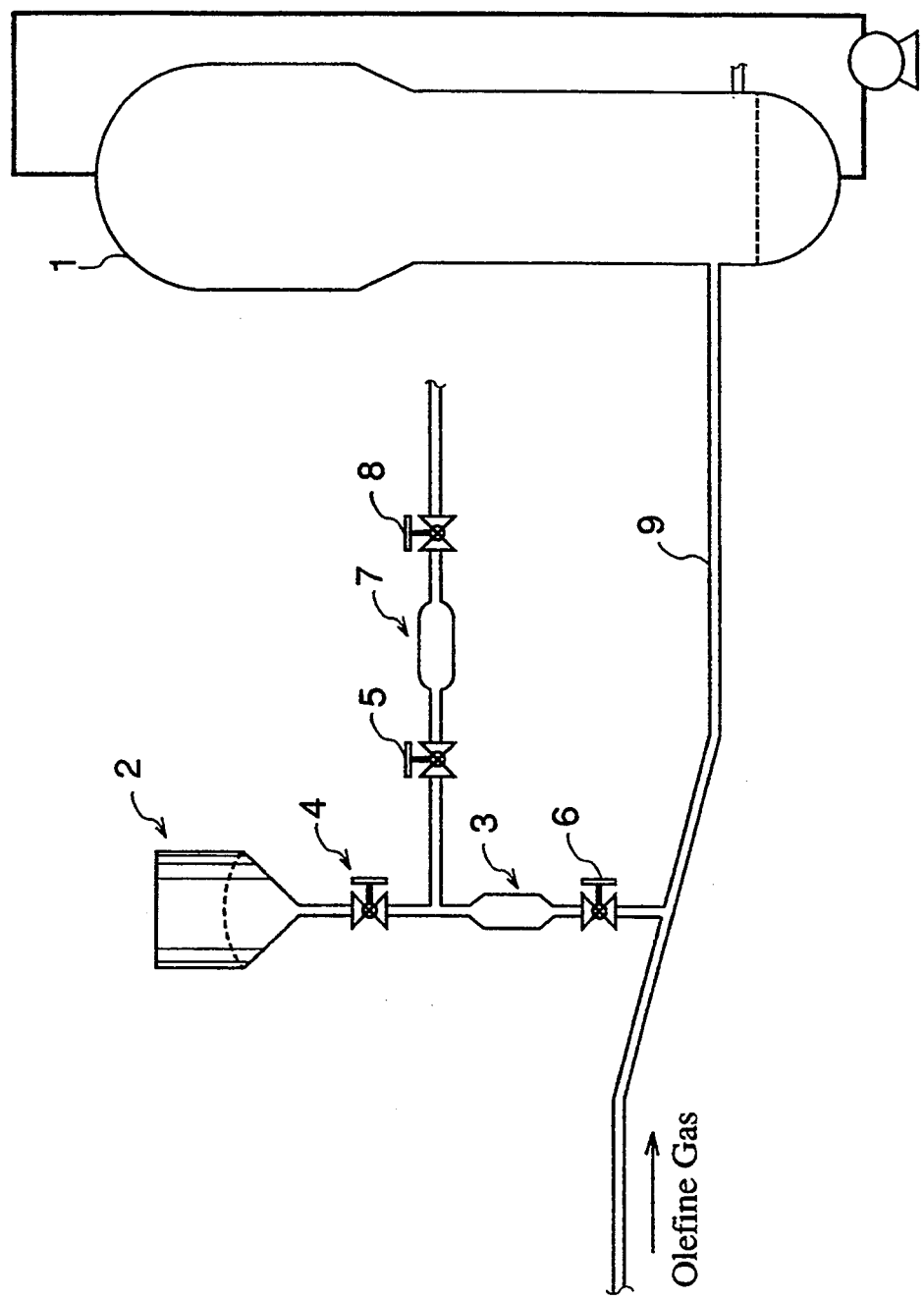
FIG. 1 is a view showing the schematic arrangement of a conventional catalyst supply system.
Figure 2:
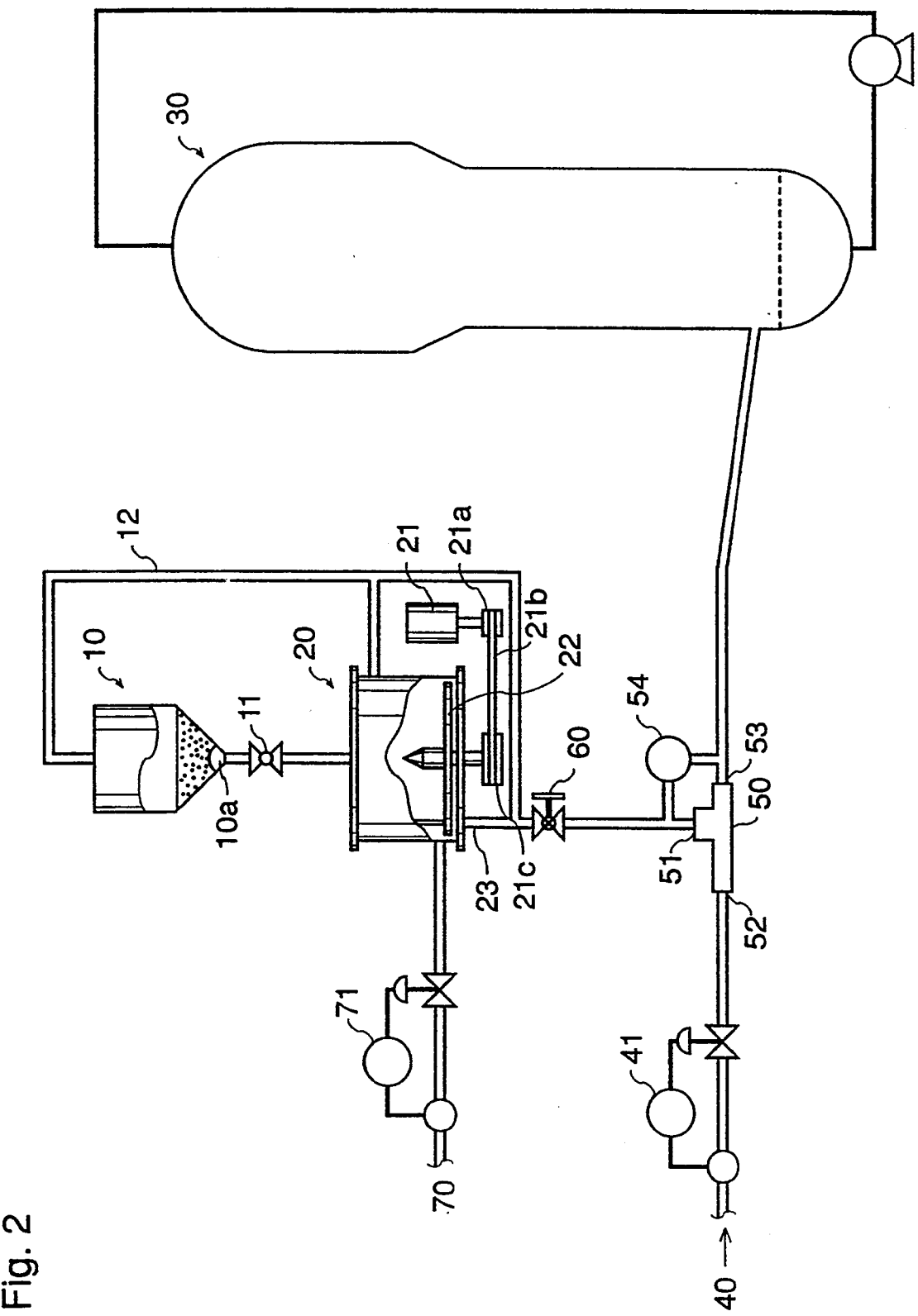
FIG. 2 is a view showing the schematic arrangement of a catalyst supply system according to an embodiment of the present invention.

FIG. 2 shows the schematic arrangement of a catalyst supply system of the present invention. This catalyst supply system comprises a hopper 10 for storing a catalyst for a polymerization reaction, a continuous catalyst supply apparatus 20 for receiving the catalyst from the hopper 10 and continuously supplying the catalyst, a gas phase polymerization reaction vessel 30, and a material gas source 40 for supplying an olefin gas as a material gas for a polymerization reaction, or an inert gas. A valve 11 is arranged at a supply port 10a of the hopper 10 so that the supply of the catalyst to the continuous catalyst supply apparatus 20 can be adjusted by operating the valve 11. In addition, a pressure equalizer 12 is arranged to adjust the pressure differences between the continuous catalyst supply apparatus 20, the hopper 10, and the outlet line of the continuous catalyst supply apparatus 20, thus allowing smooth supply of the catalyst from the hopper 10. The continuous catalyst supply apparatus 20 has a motor 21. A driving shaft 21a of the motor 21 is designed to drive a rotary disk 22 in the continuous catalyst supply apparatus 20 through a belt 21b and a pulley 21c. The material gas source 40 and the gas phase polymerization reaction vessel 30 are connected to each other through an ejector 50. A suction port 51 of the ejector 50 is connected to a catalyst supply port 23 of the continuous catalyst supply apparatus 20 through a shut-off valve 60. A material gas supply port 52 of the ejector 50 is connected to the material gas source 40 through a flow rate adjusting unit 41. A material gas exhaust port 53 of the ejector 50 is connected to the gas phase polymerization reaction vessel 30. The ejector 50 generates a negative pressure, corresponding to the flow rate of the material gas, in the suction port 51, so that the catalyst drawn through the suction port 51 is supplied from the exhaust port 53 into the gas phase polymerization reaction vessel 30 together with the material gas.

A gas source 70 for supplying an inert gas such as nitrogen gas is connected to the continuous catalyst supply apparatus 20 through a flow rate adjusting unit 71. In addition, a differential pressure gauge 54 is arranged between the material gas exhaust port 53 and the suction port 51 of the ejector 50 to measure the pressure difference therebetween. With this arrangement, a monitoring operation can be performed to prevent a material gas, supplied through the material gas supply port 52, from entering the suction port 51.

Figure 3:
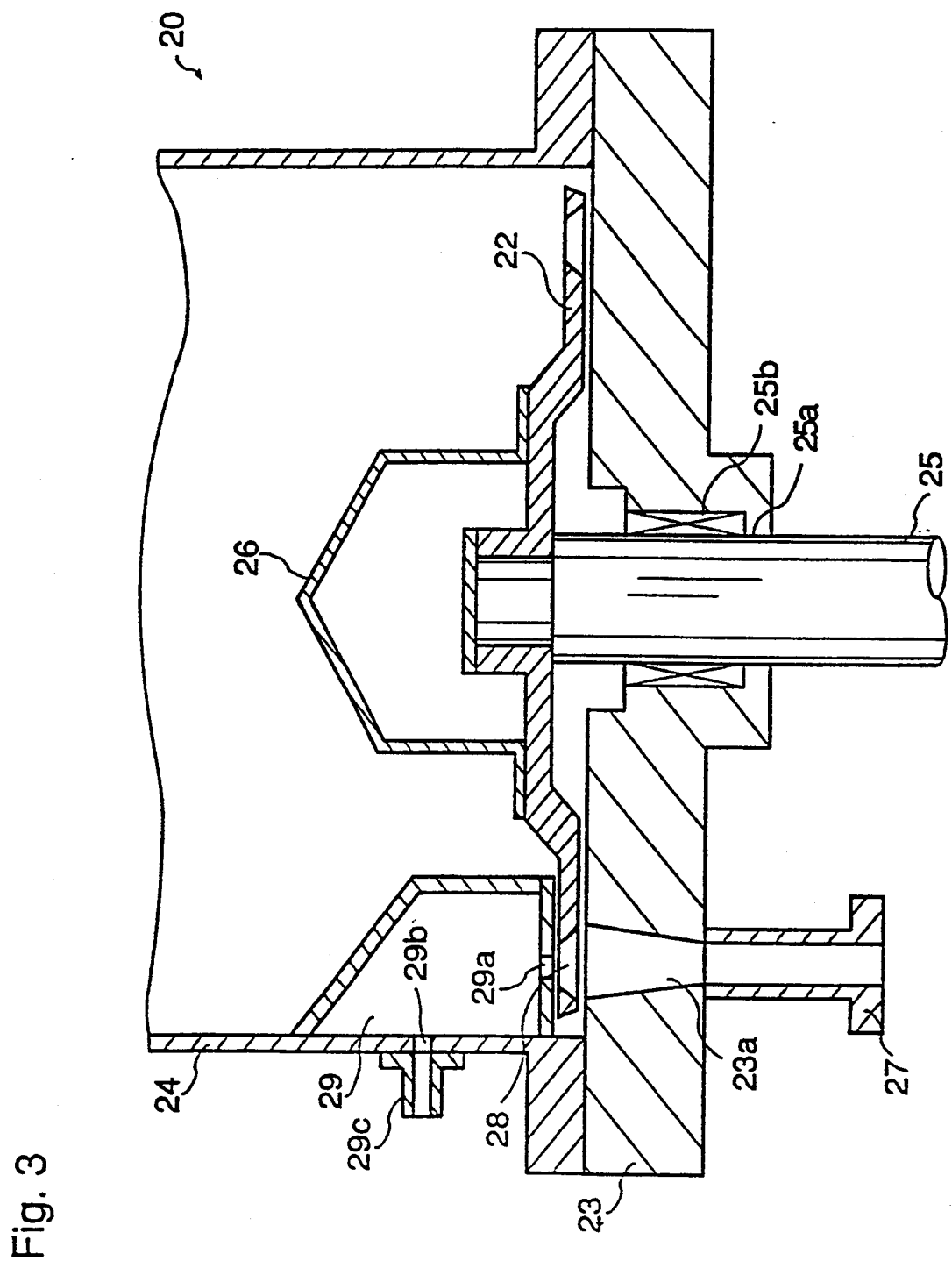
FIG. 3 is a view showing the sectional structure of a continuous powder catalyst supply apparatus in the catalyst system in FIG. 2.

FIG. 3 shows the sectional structure of the continuous catalyst supply apparatus 20. The continuous catalyst supply apparatus 20 is constituted by a base portion 23 and a cylindrical surrounding wall 24 fixed to the base portion 23. A through hole 25a is formed in the base portion 23. A driving shaft 25 rotated by the motor 21 is inserted through the through hole 25a. The driving shaft 25 is rotatably supported by bearings and a seal member 25b disposed in the through hole 25a. The rotary disk 22 is fixed to the distal end portion of the driving shaft 25 so as to be rotated by the driving shaft 25. A conical cap 26 is fixed on the rotary disk 22. The vertex of the conical distal end of the conical cap 26 is located on the line extending along the center of rotation of the driving shaft 25. With this conical cap 26, the catalyst supplied from the hopper 10 located above the continuous catalyst supply apparatus 20 can smoothly flow around the rotary disk 22.

Figure 4:
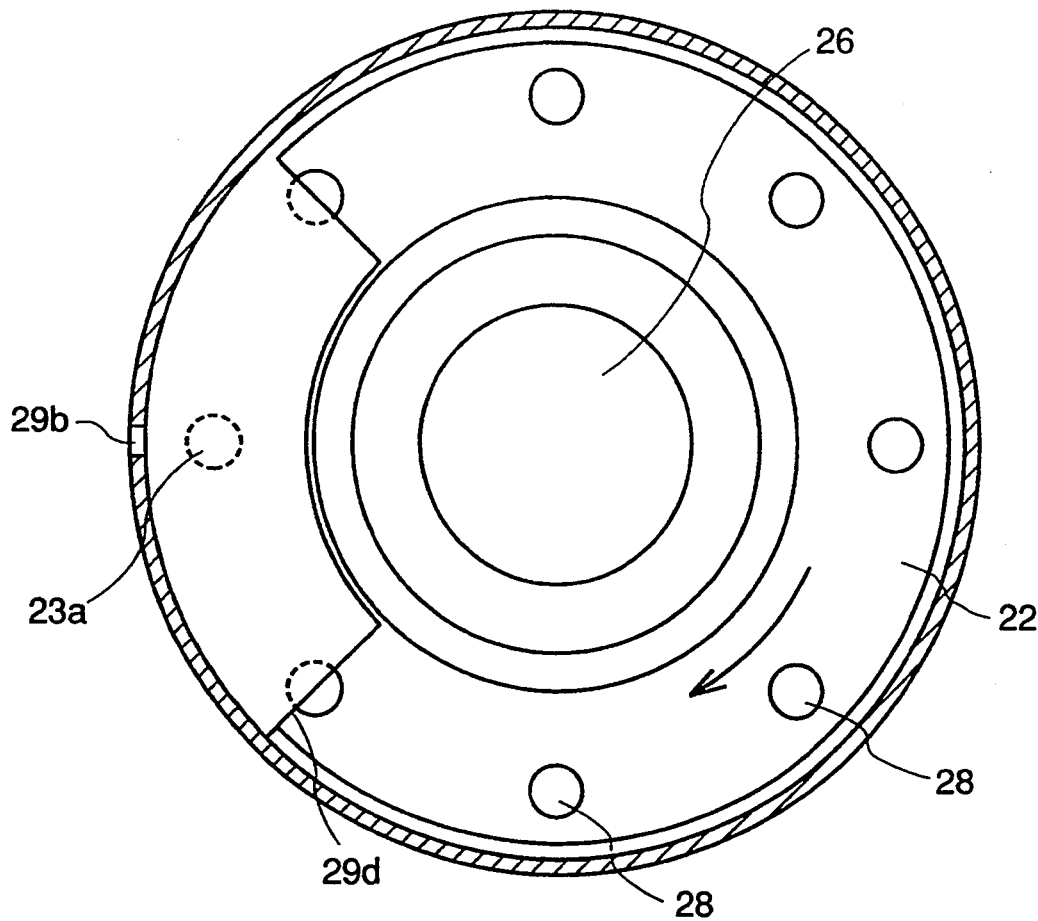
FIG. 4 is a plan view of a rotary disk of the continuous catalyst supply apparatus in FIG. 3.
Figure 5:
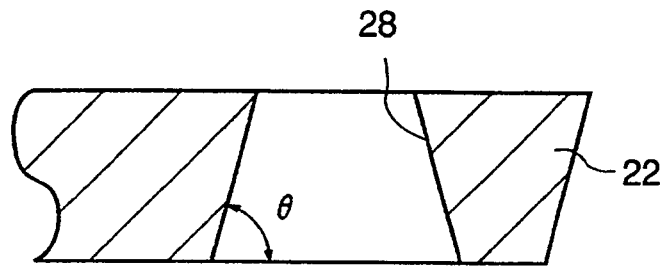
FIG. 5 is a view showing the sectional structure of a metering through hole of the rotary disk of the continuous catalyst supply apparatus in FIG. 3.

A catalyst supply through hole 23a is formed in the outer peripheral portion of the base portion 23. A connection pipe and a flange 27 are connected to the lower surface of the base portion 23 at the catalyst supply through hole 23a. As shown in FIG. 4, metering through holes 28, each having a circular shape and a predetermined size, are concentrically formed in the peripheral portion of the rotary disk 22 at equal angular intervals. The position of each metering through hole 28 with respect to the center of rotation is selected such that each metering through hole 28 accurately passes over the catalyst supply through hole 23a while the rotary disk 22 is rotated. In addition, as shown in FIG. 5, the diameter of each metering through hole 28 gradually increases toward the bottom, and an inclination angle $\theta$ of the wall of the hole is set to be slightly larger than the angle of repose. In this case, the angle of repose means the maximum angle, defined between a surface layer of granulated powder particles and the horizontal plane, at which the surface layer can be kept stationary by the friction between the particles. More specifically, it means the angle between the horizontal plane and the generating line or inclined surface of a cone formed when granulated powder particles are caused to continuously fall through a small hole or a gap to be deposited on a flat surface (Takeshi Karino, "Powder Transportation Technique", Nikkan Kogyo Shinbun-sha, p. 32). By setting the inclination angle $\theta$ to be slightly larger than the angle of repose, residence of granular particles and clogging of each hole 28 can be prevented. Furthermore, if a conductive resin is coated on the entire surface of the rotary disk 22 including the metering through holes 28, or the rotary disk 22 is impregnated with a fluorine-containing resin, slipperiness can be improved. By adding this effect to the above-described effect of the angle of repose, residence of granular particles in the respective metering through holes and clogging thereof can be prevented more effectively.

With this arrangement, the catalyst continuously falls from the metering through holes 28, and hence substantially continuous supply of the catalyst can be realized.

In addition, a pressurized gas supply chamber 29 shown in FIG. 3 is formed on a portion of the surrounding wall 24 of the continuous catalyst supply apparatus 20. The lower surface of the pressurized gas supply chamber 29 is located slightly above the surface of each metering through hole 28 of the rotary disk 22 so that the catalyst on the rotary disk 22 which is carried upon rotation of the rotary disk 22 is leveled by the edge of the lower surface of the chamber 29. Therefore, only the catalyst existing in each metering through hole 28 is substantially conveyed to a position below the pressurized gas supply chamber 29. A pressurized gas exhaust port 29a is formed in a bottom surface portion of the pressurized gas supply chamber 29. In addition, a pressurized gas supply port 29b for supplying a pressurized gas to the pressurized gas supply chamber 29 is formed in the surrounding wall 24 which constitutes a portion of the pressurized gas supply chamber 29.

An operation of the catalyst supply system of the embodiment will be described next with reference to FIG. 2.

When the valve 11 is opened, a predetermined amount of catalyst is supplied from the hopper 10 to the continuous catalyst supply apparatus 20. Since the hopper 10, the continuous catalyst supply apparatus 20, and the outlet side of the continuous catalyst supply apparatus 20 are kept at an equal pressure by the pressure equalizer 12, the catalyst can be smoothly supplied. When the supply of the catalyst is completed, the valve 11 is closed. The motor 21 is then driven to rotate the rotary disk 22. At the same time, the flow rate adjusting unit is adjusted to supply a predetermined amount of inert gas from the inert gas source 70 into the pressurized gas supply chamber 29 through the pressurized gas supply port 29b.

In the continuous catalyst supply apparatus 20, the catalyst supplied from the hopper 10 flows along the peripheral portion of the rotary disk 22. The catalyst then flows into each metering through hole 28 and is conveyed upon rotation of the rotary disk 22. A portion of the catalyst stacked above the upper surface of the rotary disk 22 at the metering through hole 28 is leveled by a side surface 29d of the pressurized gas supply chamber 29 in FIG. 4. As a result, only the catalyst existing in the metering through hole 28 is conveyed to the position below the bottom surface of the pressurized gas supply chamber 29. The conveyed catalyst in the metering through hole 28 falls from the catalyst supply through hole 23a by free fall when the metering through hole 28 overlaps the catalyst supply through hole 23a. Since the diameter of each metering through hole 28 increases toward the bottom, and the inclination angle $\theta$ is set to be slightly larger than the angle of repose, the possibility of residence of granular particles in the hole 28 and clogging thereof is low in this free fall of the catalyst. In addition, since the entire surface of the rotary disk including the metering holes is coated with a conductive resin or the rotary disk is impregnated with a fluoroplastic material, free fall of the granular particles is smoothly performed. Furthermore, the granular particles are caused to fall more reliably by a pressurized gas jetting out from the pressurized gas exhaust port 29a of the pressurized gas supply chamber 29. Moreover, by supplying such a pressurized gas into the catalyst supply through hole 23a, entrance of a material gas through the catalyst supply through hole 23a can be prevented, thus preventing the catalyst and the material gas from coming into contact with each other in the continuous catalyst supply apparatus 20.

Since the metering through holes 28 are formed in the rotary disk 22 at equal angular intervals, the catalyst can be supplied, in a predetermined amount, intermittently but almost continuously in effect.

The catalyst supplied through the catalyst supply through hole 23a is supplied to the ejector 50 through the shut-off valve 60. A negative pressure is generated in the suction port 51 of the ejector 50 upon flowing of the material gas through the material gas supply port 52. Owing to this negative pressure, the catalyst supplied from the continuous catalyst supply apparatus 20 is drawn and is discharged through the material gas exhaust port 53 together with the material gas so as to be supplied to the gas phase polymerization reaction vessel 30. By using the ejector in this manner, the amount of inert gas required to supply a catalyst to the gas phase polymerization reaction vessel in the conventional system can be reduced. In addition, since the negative pressure is used, substantially continuous supply of the catalyst can be performed while the contact of the material gas with the catalyst in the supply system is prevented. Furthermore, the pressure difference between the suction port 51 and the material gas exhaust port 53 is always monitored by the differential pressure gauge 54. Therefore, when the material gas flows back from the suction port 51 for some reason, e.g., clogging of the pipe for supplying the material gas to the gas phase polymerization reaction vessel 30, the shut-off valve 60 is immediately closed to prevent the material gas from flowing back to the continuous catalyst supply apparatus 20.

In the embodiment, each metering through hole is tapered. However, the shape of each hole can be arbitrarily changed. If the number of metering through holes is increased, and they are formed at smaller intervals, substantially continuous supply of a catalyst can be realized.

In addition, by using a variable-speed motor to rotate the rotary disk, continuous changes in the amount of a catalyst supplied can be easily made.

Note that a detector for detecting the flow rate of a powder catalyst may be arranged between the shut-off valve 60 and the ejector 50 to monitor the powder catalyst.

In the embodiment, the continuous powder catalyst supply apparatus and the catalyst supply system are associated with the manufacture of a polyolefin. However, the present invention is not limited to this but can be widely applied as an apparatus for continuously and constantly supplying granulated powder particles to a pressurizing system.

In the embodiment, the powder supply system has a single supply port. However, the system may have a plurality of supply ports. In this case, the amount of catalyst supplied to the gas phase polymerization vessel can be increased without increasing the rotational speed of the motor.

By employing the continuous powder catalyst supply apparatus and catalyst supply system of the present invention, uniform distribution of a catalyst in a gas phase polymerization reaction vessel can be realized, and the formation of a lump can be prevented. In addition, a uniform, high-quality polyolefin can be manufactured.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A powder catalyst supply apparatus comprising:
   storage means having an inlet port for receiving a catalyst, and a supply port for supplying the catalyst from said storage means;
   supply means, arranged in said storage means, for substantially continuously supplying the catalyst received by said storage means to the supply port; and
   forcible discharge means for forcibly discharging the catalyst, supplied from said supply means, through the supply port with a pressurized gas;
   said forcible discharge means comprising a pressurized gas supply chamber, arranged within said storage means, for applying a pressure to the supply port by using the pressurized gas.

2. An apparatus according to claim 1, wherein said forcible discharge means further comprises a gas source for supplying the pressurized gas, and a pipe, having flow rate adjusting means, for connecting said gas source to said pressurized gas supply chamber.

3. An apparatus according to claim 1, wherein said supply means comprises a rotary disk which rotates about a shaft perpendicular to a bottom surface of said storage means, and
   said rotary disk has metering through holes substantially arranged on a concentric circle with respect to a center of rotation, the metering through holes passing through between said pressurized gas supply chamber and the supply port upon rotation of said rotary disk.

4. An apparatus according to claim 3, wherein a bottom surface of said pressurized gas supply chamber is provided with a hole that is smaller than each of the metering through holes and is located so as to be on a track of the metering through holes.

5. An apparatus according to claim 4, wherein the metering through holes are arranged at equal angular intervals with respect to the center of rotation.

6. An apparatus according to claim 5, wherein each of the metering through holes has a downwardly increasingly tapered shape, such that the angle of the taper with respect to a horizontal plane is larger than an angle of repose of the catalyst.

7. An apparatus according to claim 6, wherein said supply means further comprises leveling means, located above the metering through hole of said rotary disk which rotates, for limiting an excessive amount of the catalyst above the metering through hole before the metering through hole passes over the catalyst supply port.

8. An apparatus according to claim 7, wherein a substantially conical cap having a conical distal end is fixed to an upper portion of said rotary disk, the conical distal end having a vertex located on a line extending along the center of rotation of said shaft.

9. An apparatus according to claim 8, wherein the supply port is formed to have a size substantially equal to that of each of the metering through holes of said rotary disk, and is downwardly decreasingly tapered.

10. A catalyst supply system comprising: said powder catalyst supply apparatus according to claim 1, an ejector connected to the supply port of said powder catalyst supply apparatus through a first pipe, and a gas phase polymerization reaction vessel connected to said ejector through a second pipe, said ejector having a suction port connected to the supply port through said first pipe, an outlet port connected to said gas phase polymerization reaction vessel through said second pipe, and an inlet port for introducing a polymerization material to be supplied to said gas phase polymerization reaction vessel,
   wherein a negative pressure is generated in the suction port by supplying a gas as the polymerization material from the inlet port to the outlet port so as to draw the catalyst through the supply port of said powder catalyst supply apparatus, thereby supplying the catalyst to said gas phase polymerization reaction vessel together with the polymerization material.

11. A system according to claim 10, further comprising a hopper, connected to the inlet port of said storage means, for storing the catalyst.

12. A system according to claim 11, further comprising a pressure equalization conduit communicating with said hopper, said powder catalyst supply apparatus, and said first pipe.

13. A system according to claim 12, further comprising a shut-off valve connected to said first pipe, and pressure control means for monitoring a pressure difference between said first and second pipes, and closing said shut-off valve when a pressure of said first pipe becomes lower than that of said second pipe.

14. A system according to claim 13, further comprising a third pipe, connected to the inlet port of said ejector, for introducing the polymerization material, and a flow rate adjusting unit attached to said third pipe.

15. An apparatus according to claim 6, wherein said entire surface has been made slippery with respect to the catalyst by coating said rotary disk with a conductive resin or by impregnating said rotary disk with a fluoroplastic material.

16. A catalyst supply system comprising:

a powder catalyst supply apparatus including storage means having an inlet port for introducing a catalyst, and a supply port for supplying the catalyst by free fall from said storage means, supply means, arranged in said storage means, for substantially continuously supplying the catalyst introduced by said storage means to the supply port, and forcible discharge means for forcibly discharging the catalyst, supplied from said supply means, through the supply port with a pressurized gas;

an ejector connected to the supply port of said powder catalyst supply apparatus through a first pipe; a gas phase polymerization reaction vessel connected to said ejector through a second pipe; a hopper, connected to the inlet port of said storage means, for storing the catalyst; a shut-off valve connected to said first pipe; and pressure control means for monitoring a pressure difference between said first and second pipes, and closing said shut-off valve when a pressure of said first pipe becomes lower than that of said second pipe; and a pressure equalization conduit communicating with said hopper, said powder catalyst supply apparatus, and said first pipe;

said forcible discharge means including a gas source for supplying the pressurized gas, a third pipe for connecting said gas source to said storage means, a flow rate adjusting means attached to said third pipe, and a pressurized gas supply chamber for applying a pressure to the supply port by using the pressurized gas supplied through said third pipe, and said ejector including a suction port connected to the supply port through said first pipe, an outlet port connected to said gas phase polymerization reaction vessel through said second pipe, and an inlet port for introducing a polymerization material to be supplied to said gas phase polymerization reaction vessel, and wherein the catalyst introduced by said powder catalyst supply apparatus from said hopper and discharged from the supply port by said forcible discharge means is drawn through the suction port of said ejector and is supplied to said gas phase polymerization reaction vessel together with a polymerization material.

17. A system according to claim 16, wherein said supply means further comprises leveling means, located above the metering through hole of said rotary disk which rotates, for limiting an excessive amount of the catalyst above the metering through hole before the metering through hole passes over the catalyst supply port.

18. A system according to claim 17, further comprising a pressure equalizer communicating with said hopper, said powder catalyst supply apparatus, and said first pipe.

19. A powder catalyst supply apparatus comprising:

storage means having an inlet port for receiving a catalyst, and a supply port for supplying the catalyst to a reactor vessel through a pipe connected to the supply port;

supply means, arranged in said storage means, for substantially continuously supplying the catalyst received by said storage means to the supply port;

forcible discharge means for forcibly discharging the catalyst, supplied from said supply means, through the supply port with a pressurized gas;

a hopper, connected to the inlet port of said storage means; and a pressure equalization conduit communicating with said storage means, said hopper, and said pipe.

* * * * *